United States Patent Office 3,545,303
Patented Dec. 8, 1970

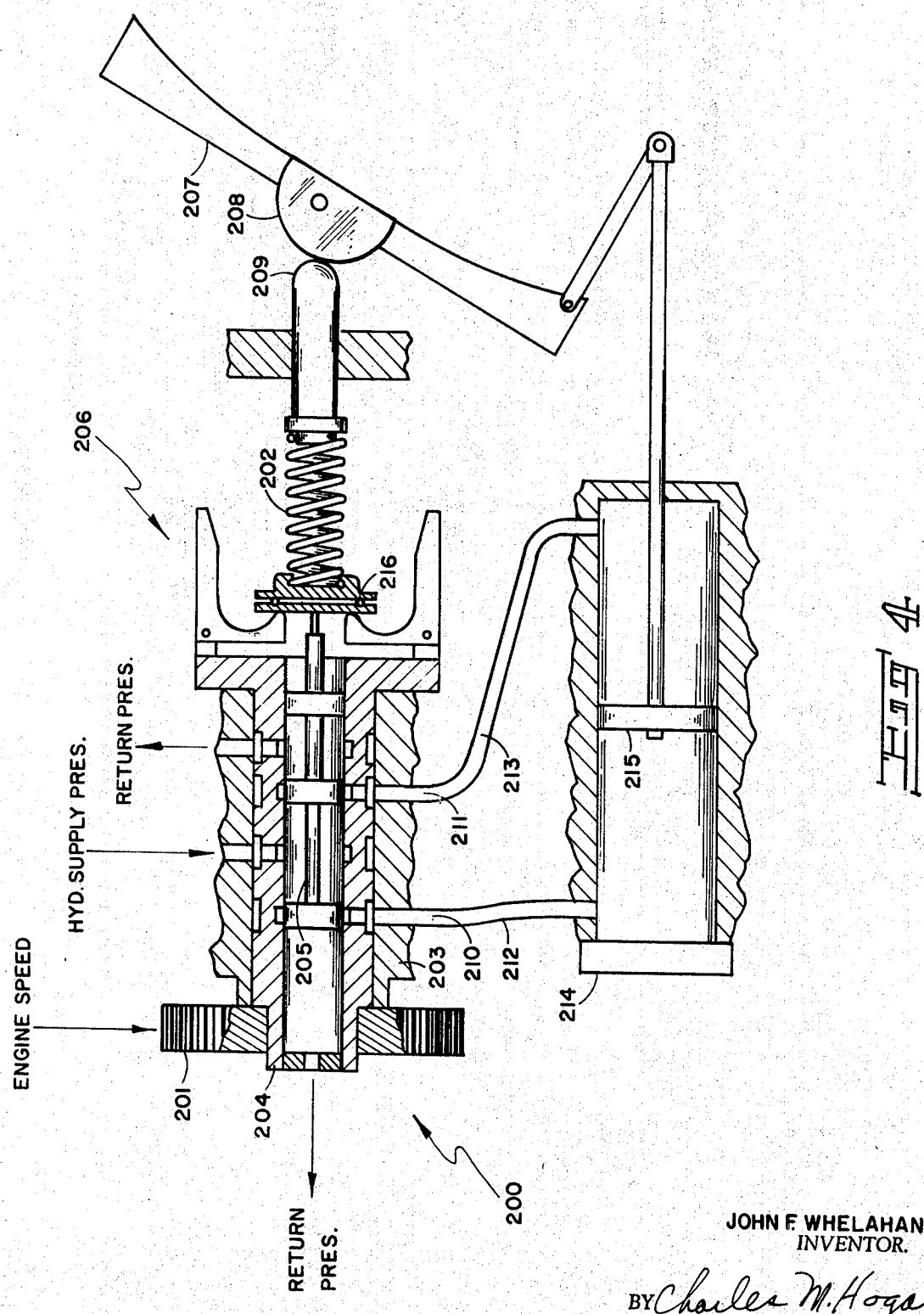

3,545,303
STEERING APPARATUS FOR TRANSMISSIONS COUPLED TO A FREE POWER TURBINE
John F. Whelahan, Monroe, Conn., assignor to Avco Corporation, Cincinnati, Ohio, a corporation of Delaware
Filed Sept. 27, 1968, Ser. No. 763,131
Int. Cl. F16h *37/08, 47/04;* B60k *21/12*
U.S. Cl. 74—720.5                                                     3 Claims

ABSTRACT OF THE DISCLOSURE

Steering apparatus for a differential transmission coupled to a free power turbine in which the steering pump is driven from the transmission input and the steering motor is of the variable displacement type controlled by transmission input speed to provide maximum steering motor displacement at maximum turbine speed and reduced displacement in direct proportion to reduced turbine speed.

---

The present invention relates to steering apparatus for double differential transmission and more particularly for transmissions coupled to a free power turbine.

A double differential transmission of the type here concerned is similar to that shown and described in patent application Ser. No. 587,569, filed by R. Ainsworth and W. J. Stein on Oct. 18, 1966, now U.S. Pat. No. 3,398,605, which is hereby incorporated by reference, and assigned to the same assignee as this patent application. Such a transmission is similar in its overall arrangement to that described in U.S. Pat. No. 3,199,376, issued to G. M. De Lalio on Aug. 10, 1965, entitled "Steering Transmission for Track Laying Vehicles." However, while the De Lalio transmission is arranged for operation with a constant speed power source, the double differeential transmission here concerned differs in that it is arranged for optimum performance with a variable speed power source, i.e., a turbine.

As is known in the art, a free power gas turbins engine is capable of operation at high efficiency over a wide range of speeds. This transmission system takes advantage of such a variable speed characteristic. In the De Lalio transmission, a hydraulic power system is used for transferring power from one planetary gear set to a second set to change the driving ratio. Because De Lalio's input speed is maintained constant, power is transmitted through the hydraulic system throughout essentially the entire range of operation. In the present case, however, power is transmitted through the hydraulics only during the power transfer operations. It is well kown in the art that hydraulic power circuits are much less efficient than mechanical gear train, i.e., overall system efficiency is increased and the size and power requirements of the hydraulic units are reduced by not transmitting power through them, except for the short periods of time when the power is being transferred to another planetary gear set.

It is an object of the present invention to provide an improved steering system.

Another object of the invention is to provide improved steering apparatus for double differential transmission adapted to be coupled to a free power source.

A further object of the invention is to provide a steering apparatus for double differential transmission wherein steering is not affected by shifts during a turn.

A still further object of this invention is to provide means for steering an all mechanical power automatic shifting double differential transmission adapted to be coupled to a turbine wherein the turning radii will not be substantially changed if a shift occurs during a turn.

A still further object of the invention is the provision of a hydrostatic regenerative steering system in a double differential transmission that provides smooth and controllable steering operation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 4 is a fragmentary and partially cross sectional view of the apparatus for biasing the steering control system.

Broadly, the transmission comprises two input power planetary gear sets for driving tracks of a track laying vehicle. Input power, supplied from a variable speed power source, such as a free power gas turbine, is connected to the tracks through the two planetary input gear sets by means of four gears, each of which provides a different drive ratio and is selectable by means of four clutches. Except during gear shifting operations, more fully described hereinafter, power is mechanically transmitted through one input planetary gear set and one selected gear. During gear shifting operations, power is transferred from the one planetary gear set to the other by means of a hydaulic system consisting of two units operating alternately as a pump and a motor. The hydraulic system serves to selectively lock the reaction member of the one planetary gear set for 100% mechanical transmission and serves to variably control the reaction forces on the reaction member during the power transfer period. The system also includes two output planetary gear sets which are driven by the four selectable gears. For steering the vehicle, an additional hydraulic system, consisting of a steering pump and steering motor, is used for oppositely rotating the reaction members of the two output planetaries to change their relative speeds.

Figure 1:
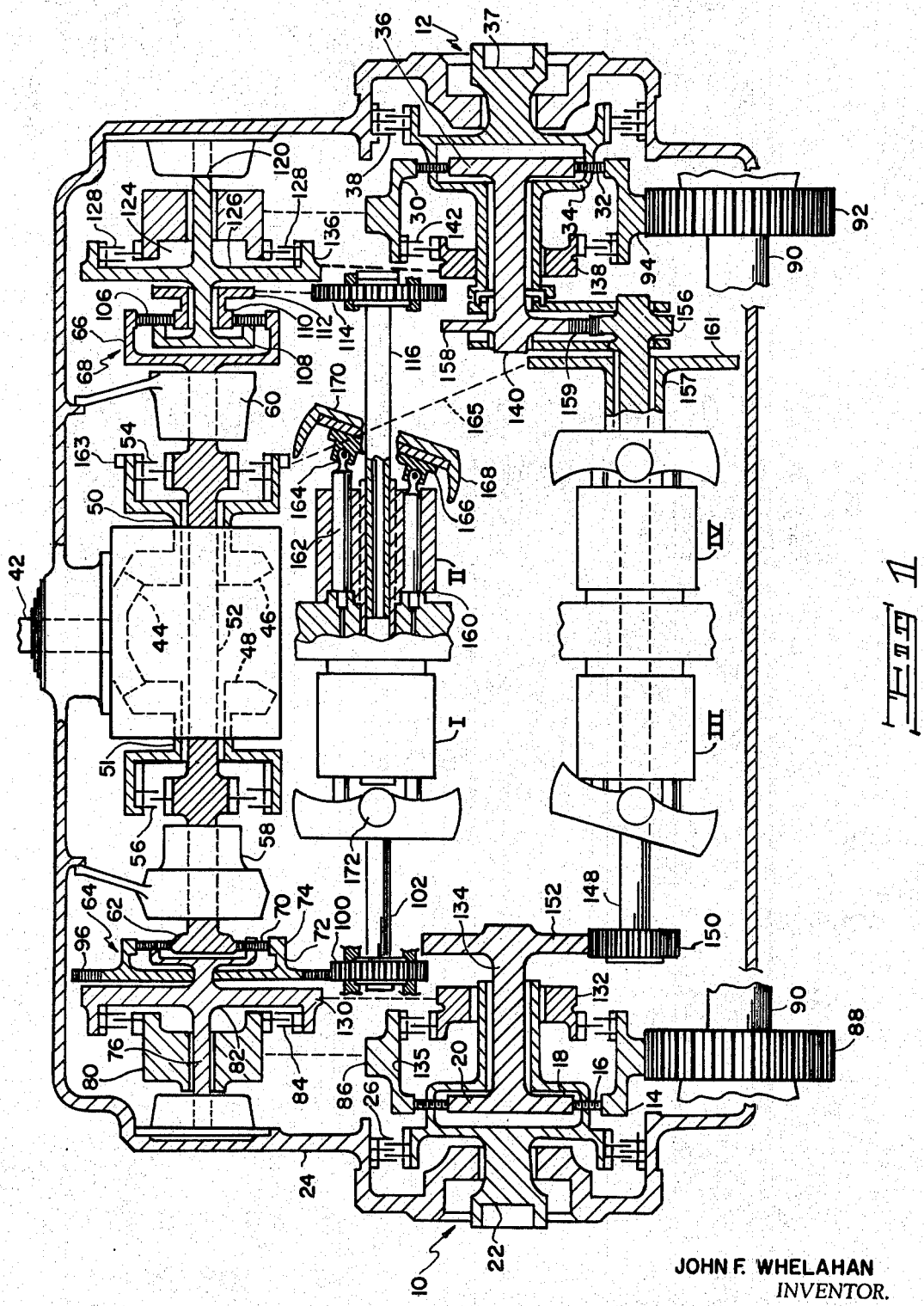
FIG. 1 is a somewhat schematic sectional illustration of a preferred form of the invention.
Figure 2:
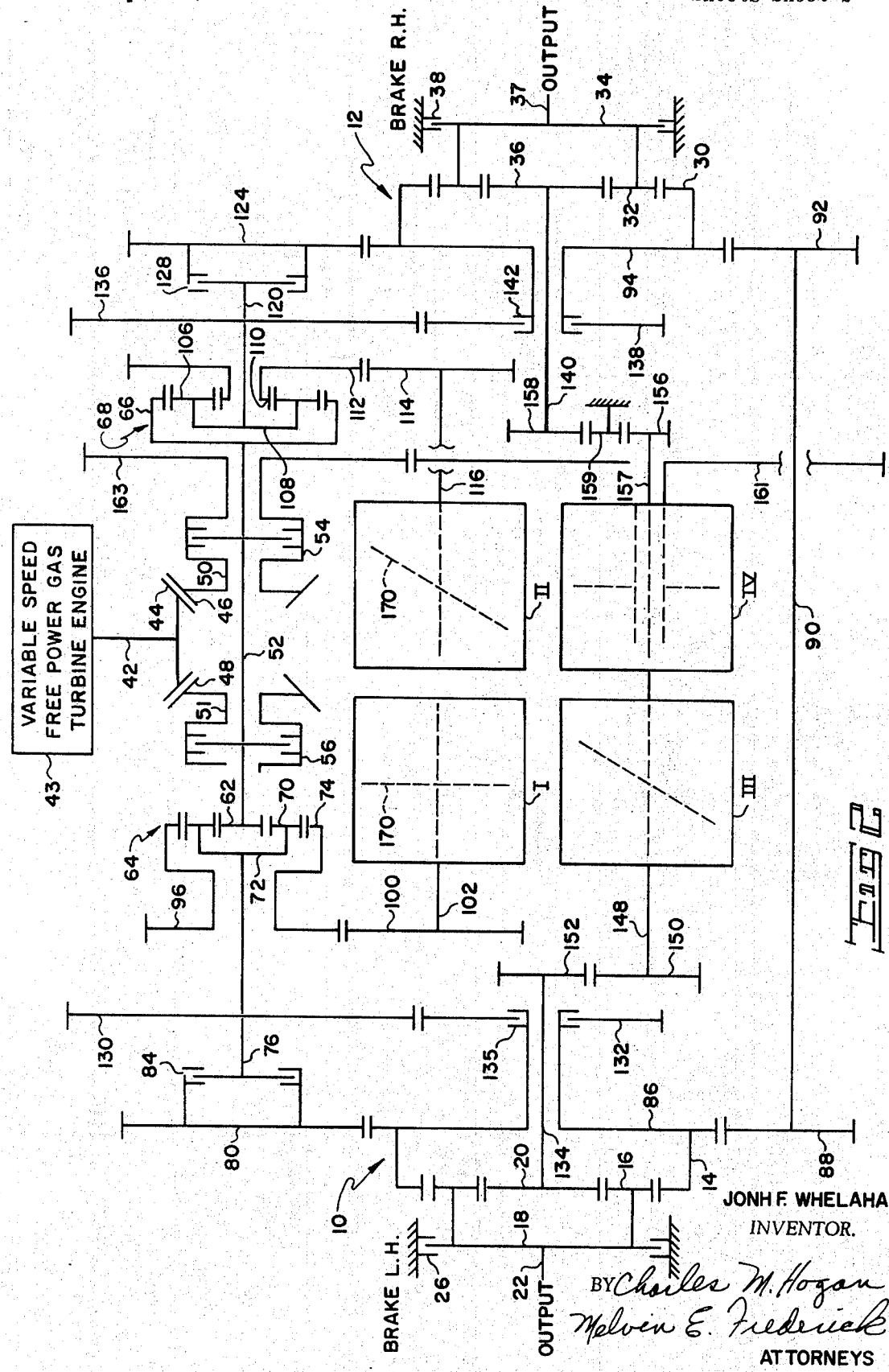
FIG. 2 is a schematic representation of the apparatus of FIG. 1.

In referring to the drawings, it should be borne in mind that FIG. 1 is somewhat schematic in that the clutches, bearings, brakes, etc., have not been shown in detail and, further, in the fact that the cross section has been laid open to more vividly expose the various components, and, consequently, certain components are out of plane. While like reference characters designate corresponding parts in FIGS. 1 and 2, it should be borne in mind that FIG. 2 is entirely schematic and many of the parts shown in FIG. 1 are not included in FIG. 2.

The transmission includes two output planetary gear sets, generally indicated at 10 and 12, respectively. The planetary gear set 10 includes a ring gear 14, planetary gears 16 rotatably supported on a carrier 18, and a sun gear 20. The carrier 18 drives an output shaft 22 which is rotatably supported within the housing 24. A conventional brake 26, having one portion fixed to the housing 24 and a second portion fixed to the shaft 22, provides braking for its associated vehicle track.

The second planetary set 12 is identically arranged, having a ring gear 30, planetary gears 32 rotatably supported in a carrier 34, and a sun gear 36. The carrier 34 drives an output shaft 37 which is rotatably supported in the housing 24. A brake 38, having one portion fixed to the housing and a second portion fixed to shaft 37, provides braking for its associated vehicle track.

In the arrangement of the planetary gear sets 10 and 12, as shown, the ring gears constitute the input or driving members for their respective sets, and the planetary gear carriers constitute the output or driven members, while the sun gear constitutes the reaction member. It will be understood that for a particular embodiment the various elements could be arranged so that any one could serve the function provided by any other.

Power for the transmission is supplied from a variable speed power sources such as a free power gas turbine engine 43 (FIG. 2) to an input shaft 42. An input bevel gear 44 fixed to the shaft 42 meshes with forward and reverse bevel gears 46 and 48 which are fixed to hollow rotatable shafts 50 and 51, respectively. The shafts 50 and 51 are rotatably supported from housing 24 and are selectively coupled to the drive shaft 52 by means of a forward clutch 54 or a reverse clutch 56. The drive shaft 52 is suitably supported in bearings 58 and 60 supported from the housing 24 and carries at its left end (as shown in the drawings) the input member, sun gear 62, of a planetary gear set 64, while on its right end it carries the input member, ring gear 66, of a planetary gear set 68. With the clutch 54 engaged and the clutch 56 disengaged, the drive shaft 52 rotates in a forward driving direction. With the clutch 56 engaged and the clutch 54 disengaged, the drive shaft 52 rotates in the reverse driving direction. It will be understood that for a particular embodiment the roles of the forward and reverse gears and clutches are interchangeable.

The planetary gear set 64 also includes planetary gears 70, rotatably supported on a carrier 72, and a reaction member, ring gear 74. The carrier shaft 76 is rotatably supported from housing 24. The carrier shaft 76 rotatably supports a first speed range gear 80 and fixedly carries a hub 82. For operation in a first speed range, a first speed range clutch 84, having portions fixed to the gear 80 and the hub 82, provides a driving connection between the carrier 72 and the gear 80. The gear 80 in turn meshes with the gear 86 on the outer periphery of ring gear 14 and, when rotated, serves to drive the output shaft 22 through the planetary gear set 10.

For driving the output shaft 37, the gear 86 also meshes with a gear 88 fixedly supported on the left end of a rotatably mounted cross-over shaft 90. The cross-over shaft 90 also carries at its right end a fixedly mounted gear 92 which drives the ring gear 30 of the planetary gear set 12 through a gear 94 on the outer periphery of the ring gear, thereby resulting in rotation of the output shaft 37.

A gear 96 fixed to the ring gear 74 of planetary gear set 64 meshes with a gear 100 fixed to the rotatably supported input shaft 102 of a hydrostatic unit I, hereinafter to be described.

The planetary gear set 68 also includes planetary gears 106, rotatably supported on a carrier 108, and a reaction member, sun gear 110. A gear 112 fixed to the sun gear 110 meshes with a gear 114 fixed to a rotatably supported shaft 116 of a hydrostatic unit II, which is identical to the unit I.

The carrier shaft 120, rotatably supported from housing 24, rotatably supports a second speed range gear 124 and fixed carries a hub 126. For driving in a second speed range, a second speed range clutch 128, having portions fixed to the second speed range gear 124 and the hub 126, provides a driving connection between the carrier 108 and the gear 124. The second speed range gear 124, in turn, meshes with the gear 94 on the outer periphery of ring gear 30 of the output planetary gear set 12 and, when rotated, serves to drive the output shaft 37 through the planetary gear set 12. For driving the output shaft 22, the gear 94, in turn, meshes with the gear 92 carried by the cross-over shaft 90 which serves to rotate the gear 88. Rotation of gear 88 causes the rotation of the ring gear 14 of the output planetary gear set 10 to rotate the output shaft 22.

The hub 82 carried by the carrier shaft 76 of the planetary gear set 64 carries a gear 130 which meshes with a third speed range gear 132 rotatably supported on the shaft of carrier 18 of planetary gear set 10. For operation in a third speed range, the ring gear 14 of the planetary gear set 10 is driven by the gears 130 and 132 through a third speed range clutch 135 having portions fixed to gears 132 and 14. Power is also transferred to the output shaft 37 through the cross-over shaft 90.

For operation in a fourth speed range, the hub 126 in the planetary gear set 68 similarly carries a gear 136 which meshes with a fourth speed range gear 138 rotatably supported on the shaft of carrier 34 of planetary gear set 12. Rotation of the gear 136 and 138 serves to drive the output shaft 37 through a fourth speed range clutch 142 having portions fixed to gears 138 and 30. As before, power is transferred to the output shaft 22 through the cross-over shaft 90.

For steering, two additional hydrostatic units III and IV, both functionally identical to the units I and II, are provided. The shaft 148 of hydrostatic unit III extends through both units and carries a gear at each end. The gear 150 on one end meshes with gear 152 fixed on the shaft 134 of the sun gear 20. The other end of shaft 148 carries a gear 156 which drives a gear 158 fixed to the shaft 140 of the sun gear 36 through an idler gear 159. Because of the idler gear 159, rotation of shaft 148 causes rotation of the associated sun gears 20 and 36 in opposite directions so as to vary the effective gear ratios of the planetary gear sets 10 and 12 and hence vary the relative speeds of the output shafts 22 and 37, respectively, to effect steering of the vehicle. In addition, the idler gear 159 allows the torque reaction of planetary set 10 to be balanced against the torque reaction of planetary set 12 for normal straight forward or reverse operation. The hollow shaft 157 of hydrostatic unit IV, suitably supported from housing 24, carries a gear 161 and it is continuously driven by the engine 43 through a gear 163 fixed to the shaft 50 and other bearing (indicated only by a dotted line 165).

A complete description of a typical hydrostatic unit is included in U.S. Pat. No. 3,212,358, issued to G. M. De Lalio on Oct. 19, 1965, and that description is incorporated by reference herein. While such a hydrostatic unit is suitable for the present application, it is to be understood that various other types of equipment may be substituted and may, in fact, be preferred. In the present construction the four hydrostatic units are identical, except for the arrangement of the shafts on steering units III and IV.

Briefly described, each hydrostatic unit comprises a drum 160 having a plurality of cylinders which slidably receive pistons 162 in a conventional manner. The end portion of each piston is provided with a ball joint 164 to which a slipper member 166 is pivoted. As its respective shaft rotates, the drum 160, pistons 162, and slipper members 166 rotate. Slipper members 166 bear against a thrust plate 168 supported within and fixed to a swash plate 170. The swash plate 170 is pivoted on trunnions 172. As the drum and pistons turn, the slipper members 166 slide on the thrust plate 186, which causes the pistons 162 to move in and out of the respective drums 160 to displace fluid. As the swash plate angle is reduced, the piston stroke is also reduced, which also reduces the displacement per revolution of its shaft.

With the swash plate of one of the units at zero angle, its shaft is free to rotate. However, if the swash plate of the associated unit is at a maximum angle, its shaft will be locked. By simultaneously tilting the swash plates of associated units, the power transferred through the units, one acting as a pump and the other as a motor, can be varied from zero to a maximum. For a further and more complete discussion of the construction and operation of the transmission, reference is made to the aforementioned Ainsworth et al. patent application Ser. No. 587,569, now U.S. Pat. No. 3,398,605, and for a further and more complete discussion of control of the aforementioned transmission, reference is made to my patent application Ser. No. 745,189, filed July 16, 1968 and assigned to the same assignee.

A hydrostatic regenerative type of steering system in accordance with the present invention is provided to insure smooth and controllable steering operation and minimum vehicle turn radius at all vehicle speeds including the pivot turn.

A controlled double differential regenerative hydrostatic steer system in accordance with the invention includes a variable displacement over-center steer pump which drives a variable displacement steer motor. The steer motor is coupled to two output differentials by a cross shaft and an idler gear which effects an equal but opposite speed change in the differential outputs which are coupled to the tracks.

For a tracked vehicle the turn radius is proportional to the average vehicle velocity divided by the difference in track velocities. The difference in track velocities is directly proportional to the hydraulic motor speed. The hydraulic motor speed for any particular motor displacement is proportional to the pump speed and displacement. Accordingly, the minimum turn radius occurs at maximum pump displacement and the difference in track speeds for minimum turn radius is therefore proportional only to pump speed for any particular motor displacement.

Figure 3:
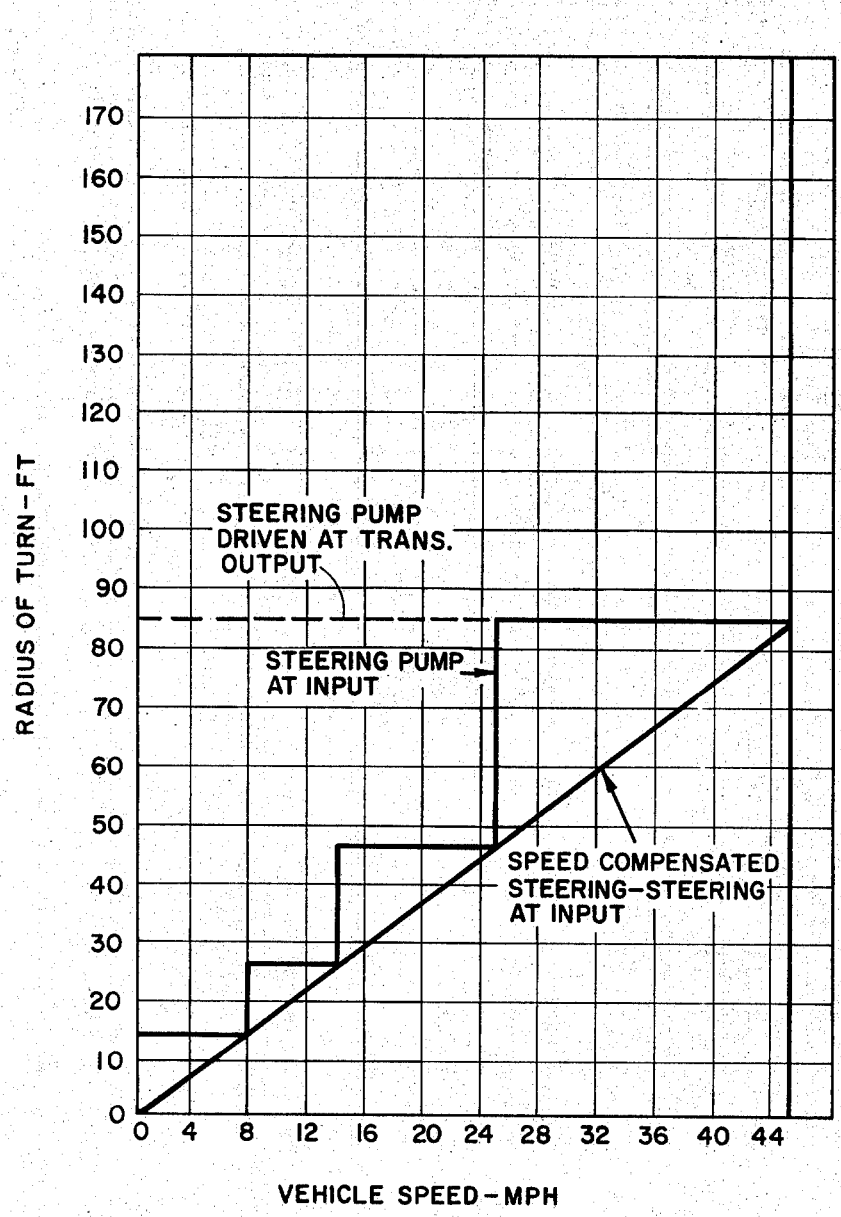
FIG. 3 is a graphic representation of radius of turn versus vehicle speed for uncompensated regenerative steering and compensated regenerative steering in accordance with the invention.

If a pump of given displacement is coupled to the output of the gear ratio changing unit, the speed of the pump will be proportional to the speed of the vehicle regardless of the gear ratio. While a larger displacement pump will give a tighter turn radius, except for zero vehicle speed, the minimum turn radius will be constant throughout the vehicle speed range. At zero vehicle speed the pump will not be rotating, hence, pivot turns are not possible. FIG. 3 depicts the constant turn radius of 85 feet for a steer system with the pump driven from the transmission output (illustrated by the dashed line) and compares this radius to the minimum turn radii of a steer system, of equal hydraulic pump and motor size, with an uncompensated pump (stepped curve) and a compensated pump (straight line) driven from the transmission input. In order to approach the tighter turn radii of the system with the pump driven from the input, the displacement of the pump driven from the output would have to be increased considerably.

If the pump is coupled to the input of the gear ratio changing unit and the motor is of the fixed displacement type, the motor speed and therefore the difference in track velocities will be proportional to the engine speed. For any fixed gear ratio, the vehicle velocity is also proportional to the engine speed. Therefore, the minimum turn radius will be a constant for any fixed gear ratio and this constant will be directly proportional to the gear ratio. With this arrangement pivot steer is possible. The minimum turn radii for four different gear ratios are plotted against vehicle velocity in FIG. 3. Although there will be an abrupt change in steer radius when the gear ratio is changed manually, as shown in FIG. 3, the condition can be made tolerable if the operator is able to anticipate the change which is made at his decision. On the other hand, if the gear change is made automatically the operator will be unable to compensate for the abrupt steer change unless the rate of ratio change is very gradual. A power shifting transmission using a torque converter in accordance with the prior art, for example, would make the steer ratio transition less sudden. However, only an automatic transmission that continuously varies the gear ratio in linear proportion to the vehicle speed will produce steer radii that are proportional to the gear ratio or vehicle velocity. Referring to FIG. 3, this would duplicate the straight line speed compensated curve. Such, however, is not possible in the case of an all mechanical power shifted transmission with which the present invention is concerned.

The straightline speed compensated curve, in which the turn radii is proportional to vehicle velocity, in accordance with the invention, is obtained by keeping the difference in track velocities constant. This is accomplished by driving the steering motor at a constant speed. The displacement of the steering motor is varied proportionately to the pump speed which is of course proportional to engine speed. At any particular displacement of the steer pump, this produces constant output speed of the steering motor. The turn radii is therefore proportional to vehicle velocity only, during any fixed gear operation. During a ratio change, the vehicle speed and therefore the turn radii varies proportional to the product of the ratio and the engine speed. In order for the vehicle velocity to remain the same before and after a shift, the engine speed must change an amount proportional to the ratio change. The turn radius therefore changes in the same linear proportion with vehicle velocity during a shift as it does during fixed gear operation.

In order to have smooth steering throughout the speed range of the vehicle in an automatic transmission as described hereinabove, the speed compensated curve as shown in FIG. 3 must be followed. The curves of FIG. 3 have been selected, by way of example, merely for purposes of explanation. To follow this curve, it is necessary, in accordance with the present invention, to have a variable displacement pump and motor with the pump being of the over-center design to allow two-way motor rotation. Conforming to the compensated speed curve gives a larger turn with increased speed and thereby reduces the sensitivity of the steering system at high vehicle speeds.

During straight line vehicle operation, the mechanical elements of the hydrostatic steering system act as reaction members only. The input reaction torques on the sun gears 20 and 36 of differentials 10 and 12 respectively are reacted by each other through an idler gear 159 and are thus kept from rotating.

The steer pump IV is driven by the input bevel mesh as previously described and is always available for use. In a nonsteering condition, the steer pump IV is at zero displacement and, accordingly, no flow is generated in the steering system. In a steering condition, the steer pump IV is at some displacement and therefore generates flow which drives the steer motor III.

The power from the steer motor III is transmitted to the sun gears 20 and 36 of differentials 10 and 12 respectively. Since the aforementioned sun gears are rotated in opposite directions by the idler gear 159 in the steering system, the output shafts 22 and 37 of differentials 10 and 12 respectively will also be rotated at different speeds. The difference in output speeds is proportional to motor speed. As previously pointed out, the steer pump IV is an over-center type and can drive the steering motor III in either direction.

Pivot steer is accomplished in the same manner as normal steer but with no vehicle forward motion. The rate of pivot steer is dependent on the speed of the steer pump IV. At full displacement, the total input power to the transmission can be used by the steer pump IV and steer motor III to perform a pivot turn.

If a fixed displacement steer motor and a variable displacement steer pump are used in the steering system, the vehicle will follow the uncompensated steering curve shown in FIG. 3. The uncompensated steering curve of FIG. 3 shows there is a minimum turn radius for each speed range (in this case four speed ranges). The turn radius varies by a factor of 1.8 from one speed range to the next because the gear changes are in the geometric step ratio of 1.8. The constant turn radius as shown in a fixed gear range occurs because the turn radius is proportional to the average vehicle velocity divided by the difference in track velocities and the vehicle velocity and track velocity difference are both proportional to engine speed.

As will now be seen from FIG. 3, for a fixed displacement (uncompensated) steer motor as noted above, the minimum turn radius in fourth range operation is 85 feet as is also the case for all ranges if the steer pump is driven at the transmission output instead of at the input in accordance with the invention. The turn radius in fourth range as shown occurs from about 45 m.p.h. to 25 m.p.h. which corresponds to a power turbine speed of 28,500 r.p.m. and 15,850 r.p.m. respectively. In third gear at 25 m.p.h., however, the power turbine speed is 28,500 r.p.m. and the steer motor is again creating the maximum difference in track velocities. The speed input to the output differentials is the same as it was at 45 m.p.h. but when combined with the vehicle speed at this condition the turn radius is reduced by a factor of 1.8. Needless to say, such a steering operation would be catastrophic due to the sudden variations in steering radii if a shift occurs during a turn. By using a variable displacement motor in accordance with the invention and as hereinafter more fully described, the speed compensated curve in FIG. 3 will be provided. The displacement of the steer motor III is proportional to the power turbine speed in each gear. Thus, at maximum power turbine speed, the steer motor is at maximum displacement and at minimum power turbine speed the steer motor is at 1/1.8 of maximum displacement which keeps the steer motor speed constant in each gear as the vehicle slows down. In the next lower speed range, at maximum power turbine speed, the steer motor will be at maximum displacement. Thus, smooth steering is attained giving a larger turning radius at increasing speeds.

As will now be seen from the preceding discussion, in a hydrostatic differential system in combination with an all mechanical transmission coupled to a free power turbine, in which the steering pump is driven from the transmission input and the steering motor is of the fixed displacement type, the minimum turning radius will be constant for any fixed gear ratio between transmission input and output. However, the minimum turning radii will change abruptly during a gear shift. With an automatic shifting all mechanical transmission in which the driver has no control over shifting, this leads to an intolerable steering situation.

In order to eliminate such an intolerable steering situation, linear turn radii with vehicle speed as shown by the compensated steering curve in FIG. 3 must be provided. This is achieved in accordance with the present invention by use of a variable displacement steering motor controlled by transmission input speed. The motor displacement is maximum at maximum engine speed and reduces in displacement in direct proportion to engine speed or transmission input speed. In accordance with the preferred embodiment of the present invention, a simple valve with a governor and a cam attached to the swash plate of the variable displacement steer motor as more fully described hereinbelow may be provided to bias the speed input.

Directing attention now to FIG. 4, there is shown a rotatable valve 200 driven by the engine or turbine via gear 201, and a governor 206 for biasing a spring 202. The valve 200 is comprised of a fixed support member 203, a cylindrical member 204 rotatably carried in the support member 203 and a spool member 205 slidably carried in the cylindrical member 204 and actuated by the combined action of the hydraulic supply pressure and the governor 206. The spool member 205 is mechanically coupled through bearing 216 to the spring 202 which is biased not only by the governor 206 but by the position of the swash plate 207 of the steer motor III (not shown) via cam 208 and cam contact rod 209. The cylindrical and support members are provided with ports 210 and 211 coupled via conduits 212 and 213 to cylinder 214. Piston 215 carried in cylinder 214 is mechanically coupled to swash plate 207 whereby a decrease in engine speed moves the swash plate toward its minimum displacement position and vice versa.

As will now be seen, upon for example a decrease in engine speed, the bias on spring 202 via governor 206 will be decreased and thereby cause spool 205 to move to the left and couple the supply pressure via port 210 to cylinder 214 via conduit 212. Piston 215 will thus be caused to move to the right until the bias on spring 202 via cam 208 moves spool 205 back to its neutral position. The reverse of that described above occurs with an increase in engine speed, the net results being the provision of the compensated steering curve shown in FIG. 3. The governor weights, governor spring and swash plate cam bias are preferably selected to result in maximum motor displacement at maximum engine speed and at minimum engine speed a motor displacement equal to minimum engine speed divided by a maximum engine speed times maximum displacement of the swash plate.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a mechanically power-shifted transmission comprising first and second ratio controlled gear sets for transmitting power from a variable speed turbine source to a loaded output shaft, said first set having first input, output, and reaction members, said second set having second input, output, and reaction members; and hydraulic variable reaction means for applying a first variable hydraulic reaction force to each of said first and second reaction members; the combination comprising:
   (a) second hydraulic variable reaction means for applying a second variable hydraulic reaction force to each of said first and second reaction members, said second reaction means comprising variable displacement overcenter steering pump means driven by said transmission and variable displacement steering motor means driven by said steering pump for effecting equal but opposite speeds of said first and second reaction members; and
   (b) means actuated by the input to said transmission for varying the displacement of said steering motor, the displacement of said steering motor being maximum at maximum input to transmission and decreasing as said input decreases, said means including rotatable valve means rotatably coupled to and actuated by (1) the said input to said transmission, and (2) coupled to and actuated by the displacement of said steering motor whereby actuation of said steering pump effects said equal and opposite speeds of said first and second reaction members to provide turn radii that varies in the same linear proportion with vehicle speed during a change in gear ratio as it does during fixed gear ratio operation.

2. The combination as defined in claim 1 wherein said rotatable valve means includes a slidable spool valve actuated by the input to said transmission and the displacement of said steering motor, and additionally including piston means actuated by said rotatable valve means for varying the displacement of said steering motor.

3. The combination as defined in claim 2 wherein said steering motor includes a swash plate and said rotatable valve means further includes a spring, governor means for applying a first compressive force to said spring as the input speed to said transmission increases, and cam means coupled to said steering motor swash plate for applying a second compressive force to said spring to oppose said first compressive force.

References Cited

UNITED STATES PATENTS

| | | | |
|---|---|---|---|
| 3,107,490 | 10/1963 | Cooper et al. | 74—687UX |
| 3,199,376 | 8/1965 | De Lalio | 74—720.5 |
| 3,225,618 | 12/1965 | Page | 74—865 |
| 3,274,855 | 9/1966 | Reynolds et al. | 74—687 |
| 3,286,543 | 11/1966 | Porter | 74—687 |
| 3,324,739 | 6/1967 | Brueder | 74—867 |
| 3,398,605 | 8/1968 | Ainsworth et al. | 74—770.5 |

ARTHUR T. McKEON, Primary Examiner

U.S. Cl. X.R.

74—865, 687